United States Patent Office 3,539,653
Patented Nov. 10, 1970

3,539,653
METHOD OF REMOVING ALKYL HALIDES FROM A HYDROCARBON STREAM WITH AN ALKANOL AMINE
Ludo K. Frevel, Midland, and Leonard J. Kressley, Saginaw, Mich., assignors to The Dow Chemical Company, Midland, Mich., a corporation of Delaware
No Drawing. Filed Sept. 5, 1968, Ser. No. 757,744
Int. Cl. C07c 7/00, 11/00; C10g 31/14
U.S. Cl. 260—681.5
10 Claims

ABSTRACT OF THE DISCLOSURE

Alkyl halides are removed from admixture with hydrocarbons, especially from mixtures containing olefins and diolefins by reacting the halides with an alkanol amine. The reaction products of the alkyl halide are usually mixtures of solid hydrohalide salts of mono- or dialkyl substituted alkanol amines, alkanol amine hydrohalides and quaternary amine halides. Recovered alkanol amine can be recycled.

---

This invention relates to a method of removing alkyl halides from admixtures containing hydrocarbons, by reacting the halides with an alkanol amine and more particularly pertains to a method of removing alkyl bromides and iodides having 1–6 C atoms from a hydrocarbon mixture containing olefins of 2–6 C atoms or diolefins of 4–6 C atoms by contacting said hydrocarbon mixture with an alkanol amine, to effect a reaction of the alkyl halide with the alkanol amine and thereby produce compounds which are readily separable from the hydrocarbon.

Certain hydrocarbon mixtures, such as those obtained by the dehydrogenation of $C_2$-$C_6$ alkanes or alkenes or a mixture thereof in the presence of elemental bromine or iodine, with or without the presence of a catalyst, at a temperature of 300–700° C., contain small quantities of alkyl bromides or iodides which must be separated from the olefin or diene that is to be used for making polymers.

Processes for dehydrogenating $C_2$-$C_6$ hydrocarbons with a small amount of free halogen or halogen liberating substance and steam or oxygen or both at 300–700° C., with or without a catalyst are known. Thus, the preparation of ethylene, propylene, butene and butadiene, isoprene, 3-methyl butene, hexene, hexadiene, 2,3-dimethyl butene and 2,3-dimethyl butadiene from their corresponding alkanes or in the case of $C_{4+}$ hydrocarbons from either the corresponding alkane or alkene, are known. In such processes, invariably small quantities or alkyl halides of lower C content than the starting hydrocarbons are formed. These are difficult to remove by distillation or usual extractive procedures.

Streams from dehydrogenation reactors almost invariably contain acetylenic contaminants which have undesirable effects on polymerization reactions of monoolefins and dienes. Therefore, the quantity of acetylenic compounds must be reduced to about 5–200 p.p.m. The most common procedures for effecting this reduction is to pass hydrogen and the so contaminated olefin or diene cut through a selective hydrogenation catalyst bed. Catalysts of this type, however, are readily poisoned by small quantities of alkyl halides. Thus, it is necessary that the halogen containing compounds be removed or converted to other compounds before going through the hydrogenation step.

If the monoolefins or diolefins are to be polymerized by heterogenous catalyst systems, such as the Ziegler or Natta catalysts, it is essential to reduce both the alkyl halide to 5 p.p.m. or less and that of acetylenic compounds to 50–100 p.p.m. or less.

It has now been found that alkanol amines having a primary amino group, will react with the alkyl halide to form an N-mono-, di- or trialkyl substituted derivatives of the alkanol amine. These derivatives are either insoluble in the alkanol amine or have considerably higher boiling points, thus making separation from the alkanol amine relatively simple, by filtration or centrifuging, if the mono-, di- or trialkyl derivatives are insoluble, or by distillation if soluble in the aminoalkanol.

The reaction of the alkyl halides with the alkanol amines can be represented as follows:

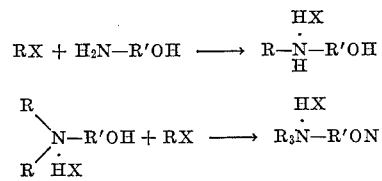

In the above formulae R is an alkyl group of 1–6 C atoms, and R' is an alkylene group of 2–6 C atoms, and X is bromine or iodine.

The alkyl halides which will react include methyl bromide, methyl iodide, ethyl bromide, ethyl iodide, the propyl bromides, the propyl iodides, the butyl bromides, the butyl iodides, and includes mixtures of the halides.

There is no true upper limit for the amount of alkyl halide contaminants that can be removed from a hydrocarbon stream. Thus, even if the alkyl halide, of the type defined, is present as a major proportion of the stream, the contaminant can be removed by adjusting the ratios at which the alkanol amine and hydrocarbon stream are admixed. Usually, however, the hydrocarbon stream will contain less than 4% or less of alkyl halide and normally, 1% or less of the halide.

The alkanol amines that can be used include ethanol amine, propanol amine, isopropanol amine, the isomeric butanol amines, the pentanol amines and the hexanol amines and mixtures of any of these alkanol amines.

The temperature at which the reaction between the alkyl halide and alkanol amine is effected can range from about room temperature to about 150° C. When operating below to slightly above the solidification temperature of the alkanol amine, it is desirable to add water to the alkanol amine to keep it in a liquid state.

The reaction can be carried on under vacuum at atmospheric pressure, or under superimposed pressure. Usually, the contaminated hydrocarbon mixture is passed through the alkanol amine as a vapor and so the reaction between the alkanol amine and alkyl halide is carried out at the autogenous pressure developed at the temperature needed to vaporize the hydrocarbon.

The amount of alkanol amine should be at least ⅓ mole per gram atom of halogen, but it is preferable to use from about ⅔ to about 2 moles of the alkanol amine per mole of alkyl halide. The alkanol amine which is not N-alkylated will thus serve as an acceptor for the HX that is formed in the reaction.

The procedure can be run as a batch process, wherein the alkanol amine can be stirred in the presence of the alkyl halide-contaminated hydrocarbon mixture. It is preferred to operate the process as a continuous one in which the alkanol amine, either alone or as a solution, is fed at or near the top of a column and the alkyl halide-contaminated hydrocarbon is fed at or near the bottom of the column. The reacted alkanol amine is continuously removed through the column bottom and the hydrocarbon substantially free of alkyl halide is removed from the top of the column.

EXAMPLE 1

The equipment for the reaction consisted of an eleven plate bubble cap column 1 inch in diameter and 15 inches long. The column had an inlet at its bottom for a $CH_3I$-contaminated butadiene stream and an outlet at the top for the purified hydrocarbon.

The column was charged with about 50 g. mixture containing 90% by weight monoethanolamine and 10% water.

A vaporized stream containing by weight 24.1% n-butane, 12.1% butene-2, 62.8% butadiene-1,3, .91% vinyl acetylene and 100 p.p.m. $CH_3I$ was fed continuously into the bottom of the reactor at a rate of 19.6 g. per hour for 6½ hours at a temperature of 23° C. The stream leaving the top of the reactor was virtually $CH_3I$-free. Analysis of a sample of the monoethanol amine taken from the bottom of the column at the end of the run analyzed 300 p.p.m. I, and a sample from the top of the column analyzed 40 p.p.m. I.

EXAMPLE 2

A stream, such as that described in Example 1, was contaminated with ethyl bromide. It was blended with monoethanol amine, in a ratio such that about 0.1 mole of ethylene bromide was present per .084 mole of ethanol amine. This mixture was reacted at 100° C. for 2 hours. At the end of this period an NMR spectrum of the white semi-solid recovered from the mixture showed the presence of

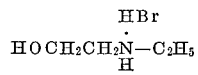

as the major product and smaller amounts of

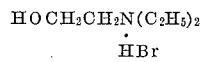

Repeating the run with a ratio of 1.65 moles of ethanol amine per mole of ethylbromide at room temperature with occasional warming to about 40° C., resulted in the formation of a viscous liquid product in the bottom of the glass test vessel. The NMR spectrum showed that excess ethanol amine was present along with

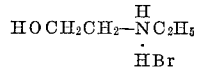

and some

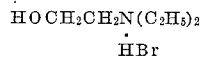

A very sensitive test for the presence of alkyl halides is one in which a mixture of the above hydrocarbons and the alkyl halides is passed over a Cu and Ni containing catalyst in the presence of hydrogen for the selective reduction of the vinylacetylene. If alkyl halides in quantities appreciably in excess of about 5 p.p.m. are present, the catalyst is poisoned in a short time. With a stream containing 100 p.p.m. (weight) of $CH_3I$, at a flow rate of 135–150 ml. and a $H_2$ flow rate of 2 to 7 ml. per minute, (both volumes measured at 24° C.) at a temperature of 180° C. in a 20 ml. reactor containing 8.7 g. of the catalyst, the latter is poisoned in 1 to 2 hours.

The sample hydrocarbon streams after treatment with the alkanol amine, prior to passage over the catalyst, using the same $H_2$-hydrocarbon ratio, feed rates and reaction conditions showed no diminution in selective reduction of the vinyl acetylene after 24 hours.

In the continuous process described above the alkanol amine in the lower part of the reactor or in the effluent can be heated to form, primarily, the trialkylalkanol amine bromide or iodide derivative. The effluent can then be cooled, freed of crystals of the said derivative, then reacted with an alkali such as NaOH or KOH to form the alkali metal bromide or iodide and the alkanol amine can be recycled to react with additional alkyl halide to purify the hydrocarbon stream.

We claim:
1. A method of removing small amounts of alkyl bromides and alkyl iodides from an aliphatic hydrocarbon comprising admixing the mixture containing said hydrocarbon and said alkyl halide with at least about 1 mole of a liquid alkanol amine based on the molar alkyl halide in said hydrocarbon at a temperature of 0° C. to 150° C.
2. The method of claim 1 in which the alkyl halide is a bromide having 1 to 6 C atoms.
3. The method of claim 1 in which the alkyl halide is an iodide having 1 to 6 C atoms.
4. The method of claim 2 in which the bromide is methyl bromide.
5. The method of claim 3 in which the iodide is methyl iodide.
6. The method of claim 1 in which the alkanol amine has an alkylene group of 2–6 C atoms.
7. The method of claim 1 in which the alkanol amine is monoethanol amine.
8. The method of claim 7 in which the alkyl halide is methyl bromide.
9. The method of claim 7 in which the alkyl halide is methyl iodide.
10. The method of claim 1 in which the hydrocarbon containing the alkyl bromide or alkyl iodide is continuously fed into the bottom of a reaction column and removed from the top of said column and the alkanol amine is continuously fed at or near the top of the said column and the reacted alkanol amine is withdrawn at or near the bottom of said column.

References Cited

UNITED STATES PATENTS

| | | | |
|---|---|---|---|
| 3,322,850 | 5/1967 | Waldby et al. | 260—683.42 |
| 3,400,171 | 9/1968 | Van Pool | 260—683.42 |
| 3,403,198 | 9/1968 | Van Pool | 260—683.41 X |

DELBERT E. GANTZ, Primary Examiner

G. E. SCHMITKONS, Assistant Examiner

U.S. Cl. X.R.

208—262; 260—676, 677, 683.41, 683.42

PO-1050
(5/69)

UNITED STATES PATENT OFFICE
CERTIFICATE OF CORRECTION

Patent No. 3,539,653      Dated November 10, 1970

Inventor(s) Ludo K. Frevel; Leonard J. Kressley

It is certified that error appears in the above-identified patent and that said Letters Patent are hereby corrected as shown below:

Column 2, delete the second formula and rewrite as follc

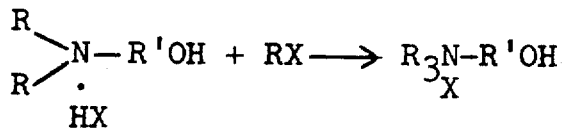

SIGNED AND
SEALED
MAR 2 1971

(SEAL)
Attest:

Edward M. Fletcher, Jr.
Attesting Officer

WILLIAM E. SCHUYLER,
Commissioner of Pate